Figures 1, 2:
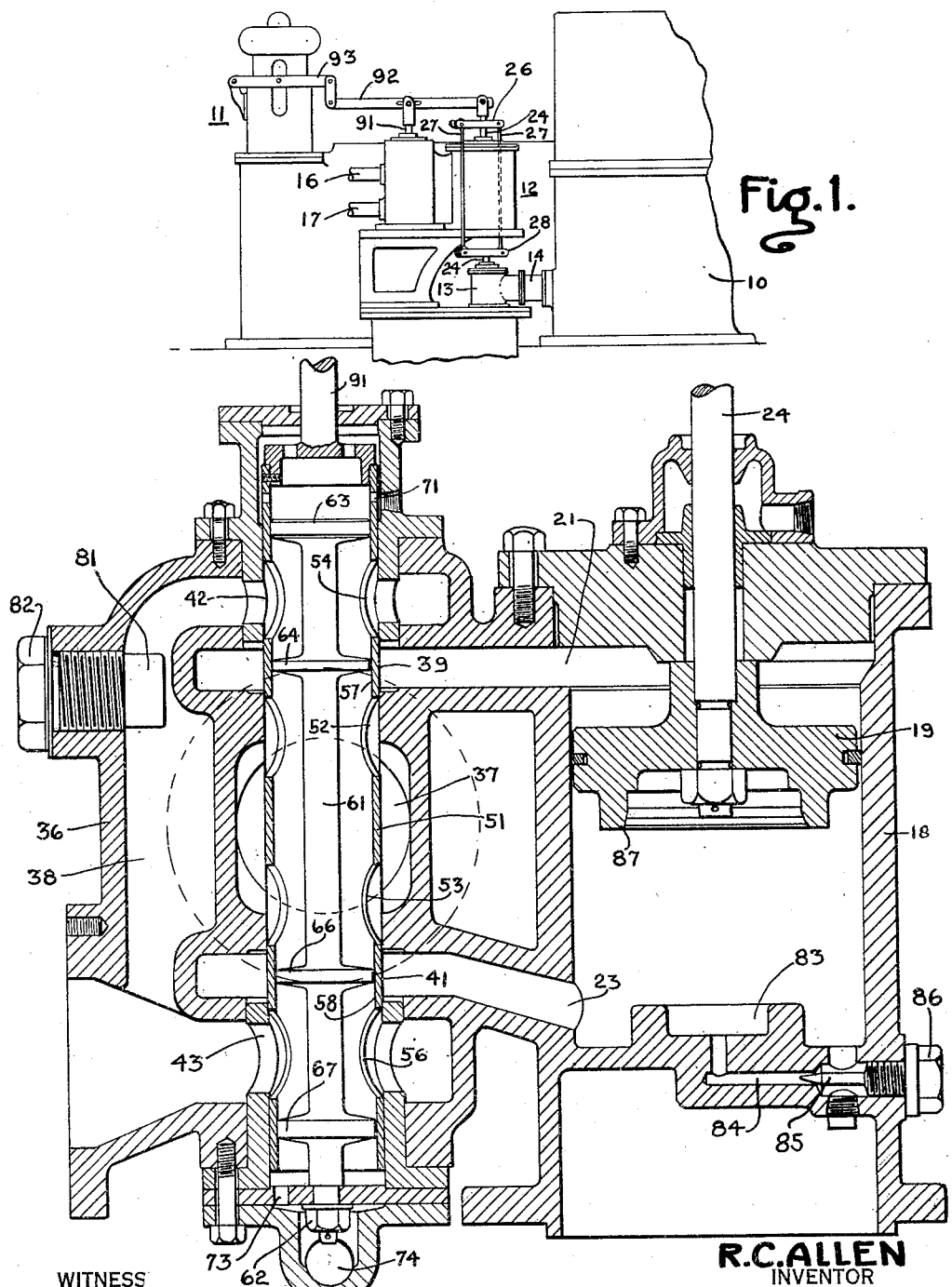

Nov. 24, 1931.   R. C. ALLEN   1,833,012

FLUID PRESSURE OPERATED RELAY

Filed Aug. 11, 1926

WITNESS
R.E.B. Wakefield

R.C. ALLEN
INVENTOR

BY A.B. Reavis
ATTORNEY

Patented Nov. 24, 1931

1,833,012

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

FLUID PRESSURE OPERATED RELAY

Application filed August 11, 1926. Serial No. 128,668.

My invention relates to fluid pressure operated relays, more particularly to relays for operating the admission valves of a prime mover, and has for an object to provide apparatus of the character designated capable of quick operation and wherein unbalanced forces due to rapid flow of actuating medium therethrough do not affect the operation of the relay.

A further object of my invention is to provide a fluid pressure operated relay for the admission valve of a prime mover wherein a relatively quick closing and a relatively slow opening of the admission valve is effected, and wherein the action of the relay is retarded during the latter part of its movement when closing the admission valve.

Apparatus embodying features of my invention is illustrated in the accompanying drawings forming a part of this invention, wherein Fig. 1 is a view, in elevation, and more or less diagrammatic, showing a turbine having my improved apparatus applied thereto; and, Fig. 2 is a vertical sectional view through the relay.

Fluid pressure relays as heretofore known to me, have usually comprised a cylinder with an operating piston and a valve of the so-called balanced type for admitting and exhausting fluid, usually lubricating oil under a relatively high pressure, from the opposite ends of the cylinder. The valve most commonly employed usually consists of a movable stem member having a plurality of piston members thereon separating the ports and passages of the valve housing and adapted upon movement to direct the flow of fluid to and from the operating cylinder. When relatively small types of power apparatus are to be controlled, and with the apparatus wherein the quick movement of the controlling elements thereof is of relatively small importance, a valve structure such as described has been found to be entirely satisfactory.

As power developing apparatus, more especially steam turbines, have increased in size and the admission valves therefor have increased in size during recent years, it has become more and more important to effect a quick operation of the valves. The power demanded for securing said quick operation has brought about serious difficulties in the operation of fluid pressure relays usually employed. In apparatus involving a necessity of quick movement and a relatively great amount of power to effect said movement, the volume of fluid passing through the controlling valve of the relay has greatly increased as compared with previous practice. The controlling valve of the relay, in handling the increased volume of fluid under pressure, with its increased rate of flow, must reverse the direction of flow of fluid through the relay while directing its flow to and from the opposite ends of the operating cylinder. This change in the direction of flow of the fluid through the valve effects a decided unbalance thereof so that, where the valve is under the control of a speed responsive governor the action of the governor has been made erratic.

In accordance with my invention, I have overcome the before mentioned difficulties by providing a relay having a fluid distributing valve therein of the sleeve type with suitable fluid admission and distributing ports divided by a stationary element with suitable piston members thereon. The area of the ports of the valve is relatively so small that the hydraulic resistance due to reversal of direction of fluid currents through the valve is inconsequential and the piston elements of the stationary member are utilized to receive practically all of the shock of fluid currents being reversed, which shock does not react upon the sleeve valve member. With this structure I provide, for all practical purposes, a perfectly balanced valve capable of effecting an extremely rapid flow of fluid to and from the operating piston and secure the desired quick action of the operating piston and the admission valve which it controls.

Inasmuch as a too rapid action of the operating piston, especially in closing the admission valve, entails the danger of damaging the seat of the valve, I provide, in my improved relay, means for retarding the movement of the operating piston during the latter part of its movement only when closing the admission valve.

I further provide means whereby the entire movement of the operating piston in opening the admission valve may be so retarded that an undue volume of steam may not be suddenly admitted to the turbine.

Referring now to the drawings for a better understanding of my invention, I show in Fig. 1, at 10, an elastic fluid turbine controlled by a sensitive control means, such as a speed responsive governor 11, through my improved fluid pressure operated relay 12 which acts to open and close an admission valve 13 controlling the flow of motive fluid through a conduit 14 leading to the turbine 10. Fluid under pressure, usually lubricating oil, may be supplied to the relay 12 from any suitable source through a conduit 16 and fluid is exhausted from the relay through a conduit 17. The relay comprises a cylinder 18 having an operating piston 19 therein with ports 21 and 23 leading, respectively, to the upper and lower ends of said cylinder. The operating piston 19 is connected to a stem 24 which in turn is connected through a yoke 26 and rods 27—27 and a second yoke 28 with the operating stem 29 of the admission valve 13. Upon upward movement of the operating piston 19 the admission valve is opened and upon downward movement of the operating piston 19 the admission valve is closed.

The flow of fluid to and from the opposite sides of the operating piston through the ports 21 and 23 is controlled by my improved valve structure which will now be described. The valve structure comprises a housing 36 having a fluid inlet passage or port 37 communicating with the conduit 16 and a fluid outlet passage 38 communicating with the conduit 17. The interior of the housing 36 defines a cylindrical valve chamber having ports 39 and 41 leading to the passages 21 and 23 for the upper and lower ends of the operating cylinder, respectively, and with upper and lower exhaust ports 42 and 43 connected with the exhaust passage 38.

Fitting within the cylindrical valve chamber is my improved sleeve valve 51. The valve 51 is provided with ports 52 and 53 which are at all times in communication with the fluid pressure inlet 37 and with ports 54 and 56 which are at all times in communication with the upper and lower exhaust ports 42 and 43 respectively. When the valve is in median position the ports 39 and 41 communicating with the upper and lower ends of the operating cylinder, respectively, are blanked off by solid portions 57 and 58 of the sleeve valve member 51. The interior of the sleeve valve member 51 defines a cylinder in which is located a stem 61, which stem is secured at its lower end to the housing 36 by means of a nut 62. Formed on the stem 61 are a plurality of piston members 63, 64, 66 and 67. The piston member 64 separates the fluid admission ports 52 and 53 of the sleeve valve from the upper exhaust port 54 and the piston member 66 separates the fluid admission ports 52 and 53 from the exhaust port 56, while the piston members 63 and 67 separate the ports 54 and 56 respectively from the upper and lower ends of the interior of the sleeve valve member. Leakage by the piston member 63 may drain off through a port 71 in the sleeve valve member, and leakage by the piston member 67 may be taken care of by a port 73 and a passage 74.

Upon upward movement of the sleeve valve member 51, the fluid admission ports 52 and 53 are placed in communication with the port 39 and passage 21 leading to the upper part of the cylinder 18, and the passage 23 and the port 41 leading to the lower end of the cylinder 18 are placed in communication with the exhaust ports 43 and the passage 38, by the ports 56 whereupon the piston member 19 moves downwardly. Upon downward movement of the valve 51, the fluid admission ports 52 and 53 are placed in communication with the port 41 and the passage 23 leading to the lower end of the operating cylinder 18, and the passage 21 and port 39 are placed in communication with the exhaust ports 54 and 42, whereupon the piston 19 moves upwardly. When the sleeve valve member 51 moves upwardly to effect a downward movement of the piston 19, fluid under pressure entering through the inlet 37 has its direction of flow changed by the stationary piston member 64 so that the stationary piston member 64 receives practically all of the shock resulting from changing the direction of flow of the fluid and the relatively small area of the edge of the ports of the sleeve valve is not affected thereby to any appreciable extent. Likewise, when the sleeve valve member 51 moves downwardly to effect upward movement of the operating piston 19 the stationary piston member 66 effects the reversal of flow of fluid and receives the shock due to said change of direction.

In the design of the valve described the areas of the ports and the flow of operating fluid therethrough is intended to be such as to effect extremely rapid operation of the piston 19. While it is important, in the operation of steam turbines, to effect as rapid a closing movement of the admission valve as possible, a rapid opening movement is not so desirable. In order that the rate of opening movement of the admission valve may be modified to any desired extent, I provide in the exhaust passage 38 communicating with the upper exhaust port 42 a means for restricting the flow of fluid from the upper exhaust port. This means of restricting the flow of fluid comprises a plug 81 which is screwed through the housing 36 and which restricts the said passage. The amount of restriction may be varied by screwing the plug 81 inwardly or outwardly out of said passage as by means of a head 82 formed thereon.

The operation of closing the admission valve of a steam turbine should be accomplished in as quick a time as possible, especially when the turbine tends to overspeed. In effecting a quick closing, however, the operation might be so rapid at the moment when the valve is being seated as to damage the valve and its seat. I accordingly provide, in my improved relay, a means whereby the operating piston 19 may move quickly downward until it approaches the end of its stroke and while the admission valve is being seated, whereupon its movement is retarded and the valve brought slowly to rest on its seat. This means, preferably of the dash pot type, comprises a central hollow cup 83 formed on the interior of the lower head of the cylinder 18 and having a passage 84 communicating with said hollow cup and with the passage 23 leading to the lower end of the operating cylinder. The restriction of the passage 84 may be controlled by a needle valve 85 which may be adjusted from the exterior of the cylinder 18 as by means of a head 86. Formed on the lower side of the operating piston 18 is a co-operating hollow cup 87 adapted, when the piston 19 is approaching the lower end of its stroke, to fit over the cup 83 and entrap fluid therein. The entrapped fluid in the cup 83 is then forced outwardly through the restricted passage 84 and around the cup 87 to the passage 23 and acts as a cushion to the piston 19 during the latter part only of the movement of said piston.

The sleeve valve member 51 is operated by means of a stem 91 connected to a floating lever 92, which floating lever is also connected to the stem 24 of the operating piston 19. The floating lever 92 is operated from the speed responsive governor 11 through a lever 93 in a well-known manner. The operation of my improved relay will now be described.

When the turbine is running at a uniform speed the parts of the apparatus may be assumed to be in the position shown in Fig. 2 with the ports 39 and 41 covered by the solid portions 57 and 58 of the sleeve valve member 51. In this position fluid above and below the operating piston 19 is entrapped and no movement takes place. Should there be an increase in speed of the turbine 10 the lever 93 moves upwardly under the influence of the governor 11 and takes with it the floating lever 92, the stem 91 and the sleeve valve member 51. Upon upward movement of the sleeve valve member 51, the upper port 39 leading to the upper side of the piston 19 is uncovered and fluid under pressure flows to the upper end of the cylinder 18 having its direction of flow changed by the piston members 64 and 66. The operating piston 19 then moves downwardly effecting a closing movement of the admission valve 13 and taking with it the floating lever 92 and valve 51 until the port 39 is again covered. As the piston 19 moves downwardly, fluid from beneath it passes outwardly through the passage 23 and ports 41 and 56 to the exhaust passage 38. As soon as the ports 39 and 41 are closed by the valve 51 no further movement takes place until there is a change in speed of the turbine 10.

Should there be a decrease in speed of the turbine 10, the lever 93 moves downwardly effecting a downward movement of the valve 51 whereupon the port 41 is uncovered to the incoming fluid pressure and the port 39 is open to the exhaust. Fluid under pressure passes through the ports 41 and 23 to the under side of the operating piston 19 while fluid is being exhausted from the upper side thereof and the admission valve is moved in an opening direction. The upward movement of the piston 19 is retarded by means of the plug 81 in the passage 38 which retards the exhaust of fluid from the upper side of the operating cylinder.

Should there be a sudden increase in speed, such as would demand full closing movement of the admission valve 13, the lever 93 moves upwardly to its extreme position opening wide the ports 39 for the admission of fluid under pressure above the piston 19 and opening wide the ports 41 for the exhaust of fluid pressure from beneath the piston 19. The piston 19 thereupon moves quickly downward the full length of its stroke. As it approaches the latter part of its stroke the cup 87 entraps fluid in the cup 83 and acts as a dash pot to the movement of the piston 19. The fluid in the cup 83 being forced to pass outwardly thereof through the restricted passage 84 and by the needle valve 85 to attain the passage 23.

From the foregoing it will be apparent that I have devised an improved fluid pressure operated relay wherein hydraulic resistance due to change of direction of fluid flow through the valve structure is offset by a stationary member, wherein an extremely rapid movement of the relay may be effected and wherein said movements may be retarded at desired points.

While I have shown my invention in but one form it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

The combination with a governor, of a fluid pressure relay including a cylinder, a piston operating in said cylinder, a cylindrical valve chamber having a port communicating with each end of the cylinder, a fluid admission port disposed intermediate the first-mentioned ports and fluid exhaust ports disposed respectively beyond the first-mentioned ports, a cylindrical sleeve thin-walled valve member actuated by the governor and disposed in the cylindrical valve chamber, said valve member having solid portions which cover the ports leading to the cylinder in the cut-off position of the valve member and having ports on opposite sides of each solid portion which are in communication with the fluid admission port and a fluid exhaust port, respectively, at all times, and a stem fixed to the stationary structure of the relay and having piston portions within the interior of the valve member, said piston portions separating that portion of the interior of the valve member which communicates with the fluid admission port from those portions which communicate with the exhaust ports, said pilot valve operating to effect movement of the operating piston by movement thereof placing ports in the valve member in registry with the ports in the valve chamber leading to the cylinder.

In testimony whereof, I have hereunto subscribed my name this 27th day of July, 1926.

ROBERT C. ALLEN.